United States Patent [19]

Houser

[11] 3,908,440

[45] Sept. 30, 1975

[54] METHOD AND APPARATUS FOR FIRE TESTING GYPSUM BOARDS AND THE LIKE

[75] Inventor: James L. Houser, Berwyn Heights, Md.

[73] Assignee: The United States of America as represented by the Secretary of Commerce, Washington, D.C.

[22] Filed: Sept. 4, 1974

[21] Appl. No.: 503,129

[52] U.S. Cl. .................................................. 73/15.6
[51] Int. Cl.² .......................................... G01N 3/18
[58] Field of Search ..................... 73/15, 15.6, 100

[56] References Cited
UNITED STATES PATENTS

| 1,324,418 | 12/1919 | Twyman | 73/15.6 |
| 1,491,949 | 4/1924 | Francke | 73/100 |
| 2,645,932 | 7/1953 | MacLaren | 73/15.6 |
| 2,895,327 | 7/1959 | Monego et al. | 73/15 |

OTHER PUBLICATIONS

Test C473–68 in Annual Book of ASTM Standards, printed by A.S.T.M., 1916 Race St., Phila., Pa., 1973.

Test E119–73 in Annual Book of ASTM Standards, 1973.

*Primary Examiner*—Herbert Goldstein
*Attorney, Agent, or Firm*—David Robbins; Alvin Englert

[57] ABSTRACT

A method and apparatus for testing the fire resistance of wallboards such as gypsum boards and the like is disclosed. A narrow rectangular test specimen firmly held at one end is flexurally stressed during the test by suspending a weight from the cantilevered end of said specimen. Above and below the midsection of the specimen, of the faces thereof, are a pair of burners. Each burner emits a turbulent flame at an average temperature of about 1,780° F. The test is terminated when the specimen either breaks or deflects through an arc three times the specimen thickness.

8 Claims, 3 Drawing Figures

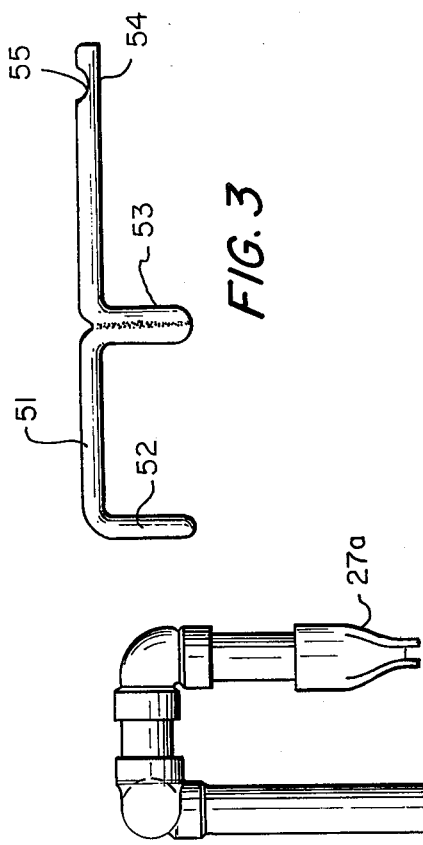
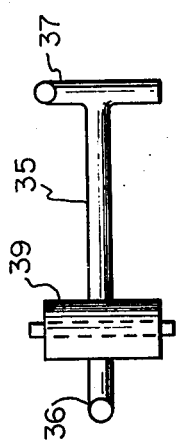
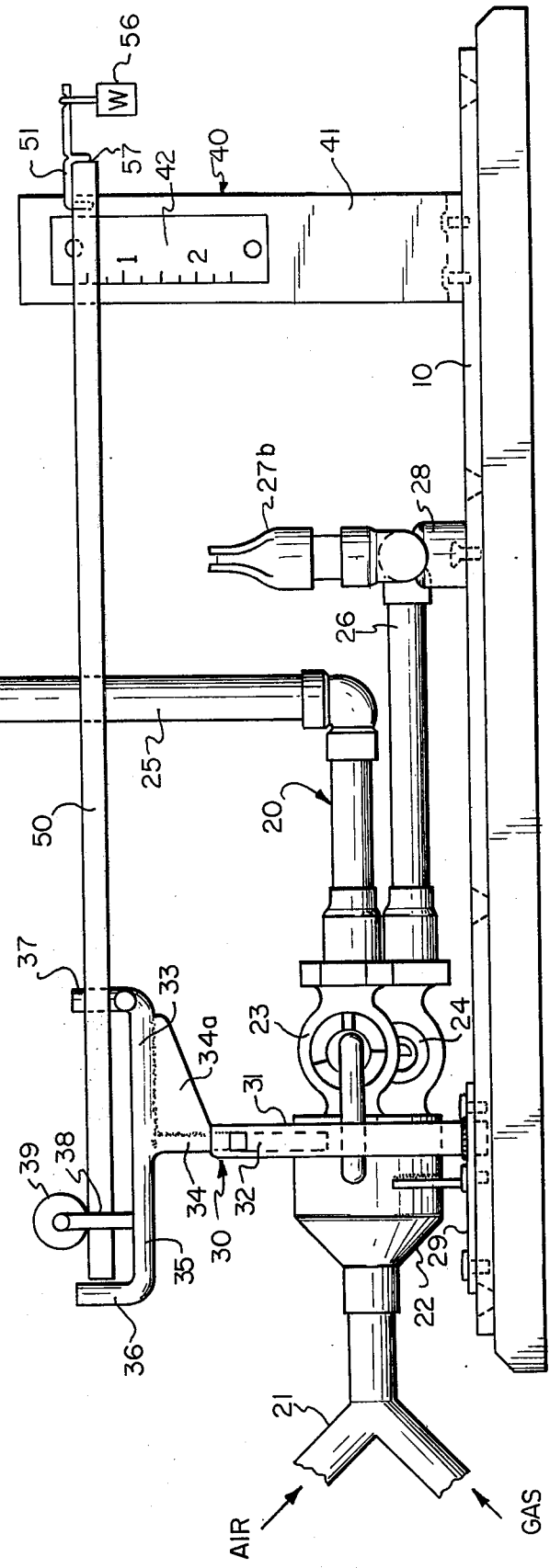
FIG. 3
FIG. 2
FIG. 1

3,908,440

METHOD AND APPARATUS FOR FIRE TESTING GYPSUM BOARDS AND THE LIKE

BACKGROUND OF THE INVENTION

1. Field of the Invention

This invention relates to apparatus and method for carrying out fire rating tests for gypsum board products and the like.

2. Description of Prior Art

Two alternative bench testing methods are currently under study by the ASTM Committee C-11 on Ceilings and Walls for rating Type X cores. A Type X core is one that includes non-combustible fibers in the core structure.

One method described in ASTM C-473 [1], suspends a 2 inch (5.08 cm) by 12 inch (30.48 cm) specimen vertically between two Meeker burner flames. The specimen has a 1000 gram weight attached to the lower edge and failure is recorded when the specimen breaks.

[1] Annual Book of ASTM Standards, Part 9, 1973, pp 347–352. Designation C-473 is under jurisdiction of Committee C-11 on Ceilings and Walls.

The second method uses 2 inch (5.08 cm) by 8 inch (20.32 cm) specimens that are first calcined in a muffle furnace at 800° F (427° C) for 2 hours. The sample is then placed over a fulcrum and lead shot is added at a measured rate to a cup supported at a cantilevered end. The weight of the shot is measured when the specimen breaks as an indication of the relative strength of the calcined core.

After careful visual observations of the behavior of Type X gypsum wallboard during the course of 14 full scale wall and four floor/ceiling E-119 [2] furnace tests, it was determined that the stresses placed on the wallboard in such severe fire exposures are flexural rather than tensile. Accordingly, a testing procedure which determined the flexural stresses on the Type X gypsum load while under fire exposure would give more meaningful results.

[2] Annual Book of ASTM Standards, part 14, 1973. Designation E-119-73 is under jurisdiction of Committee E-5 on Fire Tests of Materials and Constructions.

SUMMARY OF THE INVENTION

This invention relates to a method and apparatus for the flame testing of wallboards such as gypsum boards. A rectangular sample is rigidly held at one end while gas flames play on both sides of the sample and a weight is suspended from the other end. In one embodiment, center of the gas flames is located at the midpoint of the unsupported portion of the sample and its temperature is from about 1755°F. to about 1805°F. Time to failure is determined by the specimen breaking, or when it shows a deflection at the unsupported end of three times the thickness of the test specimen.

It is an object of this invention to provide an apparatus for determining the fire resistance of a test strip for wallboard or the like which comprises an arrangement for supporting the test strip at one end in a cantilever position, means for applying a force at the other end, and means for applying a narrow gas flames on opposite surfaces and at a point intermediate of the ends of the test strip.

A further object of the invention is to provide a method for determining the fire resistance of a test strip of wallboard by supporting the strip at one end in a cantilever position, applying a force to the other end, applying gas flames on opposite surfaces of the test strip at a point intermediate the ends of the test strip, and noting the time for failure or a predetermined deflection of the strip.

Further objects will become apparent from the following description of the invention.

BRIEF DESCRIPTION OF THE DRAWING

FIG. 1 is a view in elevation of the test apparatus showing a test specimen in place.

FIG. 2 is a plan view of the cantilever clamping means.

FIG. 3 is a view in elevation of the weight suspension clip.

DESCRIPTION OF THE PREFERRED EMBODIMENT

A. Introduction

The gypsum industry currently produces gypsum board products at an annual rate in excess of 14 billion square feet.[3] These products constitute more than 80 percent of all finished wall and ceiling surface materials used in the United States construction industry. Approximately one-fifth of this total production is devoted to special fire resistant products that go into systems and assemblies which are required to have a fire endurance rating as determined by the "Standard Method of Fire Tests of Building Construction and Materials," ASTM Designation E-119.[4]

[3] U.S. Bureau of Mines, Mineral Industry Survey, 1972 and through 2nd quarter 1973.
[4] Annual Book of ASTM Standards, Part 14, 1973. Designation E-119-73 is under jurisdiction of Committee E-5 on Fire Tests of Materials and Constructions.

These fire rated assemblies are used as wall systems for occupancy separations and public exitways, chases, shafts, column and beam fire protection and floor/ceiling systems. They are used primarily in highrise construction, commercial, institutional and multifamily buildings. The basic gypsum board product used in these rated assemblies has a special core formulation that includes noncombustible fibers and is defined generically as Type X by ASTM C-36.[5]

[5] Annual Book of ASTM Standards, Part 9, 1973, pp 31 – 32. Designation C-36 is under jurisdiction of Committee C-11 on Ceiling and Walls.

Gypsum has several unique properties which make it an effective barrier to fire. Chemically expressed as $CaSO_4 2H_2O$ or technically as "dihydrous calcium sulphate," it is about 50 percent water by volume or about 21 percent water by weight. When gypsum is exposed to a high temperature most of the chemically combined water of crystallization is slowly released as steam, a process known as calcination. The temperature behind the plane of calcination is just slightly higher than that of boiling water. Even after calcination is complete the gypsum remaining in place acts as an insulating barrier to the transmission of heat and flame.

In the early 1940's, efforts were made to improve the fire resistive characteristics of regular gypsum wallboard. Experimentation with additives to the core material led to the first patent on a special fire retardant gypsum wallboard. This was U.S. Pat. No. 2,526,066 issued to Croce and Shuttleworth. The first Underwriters' Laboratories (UL) materials listing of special fire retardant gypsum wallboard appeared in 1946. Further refinements of the original work described in the patent resulted in the use of unexpanded vermiculite and siliceous clays to thermally stabilize the core and compensate for the effect of shrinkage during calcination. Noncumbustible glass fibers dispersed throughout the core act as a reinforcing mat to hold the calcined core intact for extended periods of time during exposure to fire.

For a number of years now the need has been apparent for a reliable bench test to determine the fire resistance of Type X core gypsum boards while under flexural stress. This requirement was met by causing a premixed turbulent gas flame to impinge on opposite sides of a sample, which was under constant flexure.

In order to achieve consistent results the flame area was concentrated in a sharply defined path across the specimen instead of concentric radiations of varying flux. A temperature of between 1,500° and 2000°F. was selected, which corresponds (at above about 1765°F.) to an exposure time in excess of 1 hour and 20 minutes on the standard time-temperature curve given in ASTM E-119-73, pp. 569, 579, 580. To be effective the temperature must exceed the softening point of glass fiber at 1,290°F.

B. Apparatus

Referring to FIG. 1, the apparatus comprises a base 10 on which is supported a gas burner assembly 20, a cantilever support structure 30 and scale structure 40. Pressurized air and city gas (or other gas supply) is supplied through a "Y" connection 21 to a mixing chamber 22 which also acts as a constant pressure reserve. The fuel mixture then passes through two balancing level valves 23 and 24 and goes through lines 25 and 26 to upper and lower wing tip burners 27a and 27b. The balancing lever valves are used to proportion the correct amount of fuel between the upper and lower burners and to keep the midpoint of the flames at the same plane of the specimen. A desirable wing tip burner opening is 0.040 inches and the orifice at the valve lever should be large enough to furnish sufficient fuel at the burner tips. The burner assembly is securely fastened to base 20 by means of brackets.

Support structure 30 comprises a vertical post 31 bolted at one end thereof to base 10. Said post has an axial bore 32 at its upper position. Vertical standard 34 of yoke 33 fits rotatably in said bore 32 and is retained in position by gusset plate 34a bearing on the upper portion of post 31. Yoke 33 consists of a horizontal metal rod 35 bent up at one end at 36. The other end of rod 35 has welded thereto an L-shaped elbow 37 of the same diameter as the rod. As shown in FIGS. 1 and 3, rod 35 is attached to the midpoint of one arm of the L and the other arm 36 is vertical.

A U-shaped member 38 is welded at the midpoint of one of the arms of the U, to rod 35 at about one-quarter of the distance from the end of element 35. Gusset plate 34a is welded to standard 34 and rod 35 for rigidity. A sleeve 39 is adapted to fit over the upper arm of 38 and to bear upon wallboard sample 50. Different sized sleeves are employed to accomodate different thicknesses of wallboard and keep them in a level plane. If necessary, thin shims may be employed in addition for more severe variation in wallboard dimensions.

Near the other end of the base is a vertical scale structure 40 comprising a vertical bar 41 fastened to base 10 and having indicia 42 mounted thereon.

Burner tips 27a and 27b are along a vertical axis, and a test wallboard specimen, as will appear more fully hereinafter, has the centerline of its thickness along a horizontal axis bisecting the said vertical axis. Support structure 30 and scale structure 40 are in line with the horizontal axis, with 40 being offset by an amount necessary to accomodate the width of a test wallboard specimen.

Wallboard specimen 50, which in this embodiment is two inches wide by 16 inches long, has one end retained in 30 by means of sleeve 39 on element 38. The other end extends past bar 41 and has mounted at said end a weight suspension clip 51. Specimen 50 has a hole drilled 1 inch from the end at the center of its face. Into said hole fits arm 52 of the clip, while arm 53 rests at the end of specimen 50 as shown in FIGS. 1 and 3. Arm 54 extends past 53 and has a notch 55 which is adapted to receive a weight 56. The vertical axis between burners 27a and 27b bisects the length of the wallboard specimen between element 37 and the end 57 near the weight.

TEST SPECIMENS

Test specimens are 2 inches wide (5.08 cm) by 16 inches long (40.64 cm) cut from the long or machine direction of the board. A tolerance of ± 1/16 inch is allowable. The specimens should be saw cut rather than scored and snapped to insure close tolerances. Care should be exercised in the selection of the specimens to be tested in order to achieve a reasonably good representative sampling. For instance, the specimens should not be cut from the "stream merging points" approximately one-third in from either edge nor cut any closer than 8 inches in from either edge as many manufactures may use a "hard edge" formula mix. Following these guidelines will also avoid the area where most gypsum boards are reduced in caliper to form an exposed, featured, or tapered edge to receive a joint finishing treatment.

Each specimen is conditioned for a period of 24 hours in a 68°F. ± 5°F. conditioning room or chamber with a constant 50 percent ± 5 percent relative humidity (RH). A 9/64 inch hole is drilled through the core one inch from one end of each specimen to accomodate the clip from which the weight is to be suspended.

D. TEST PROCEDURE

The burners are ignited and the gas flow adjusted until this is 20 standard cubic feet per hour (scfh). Air is then added to approximately 60 scfh. Eight temperature points are then recorded with a 20 gage chromel-alumer thermocouple; four across the centerline of the flame midway between the burners and two above and two below at the greater points. The average frame temperature required as 1780° F ± 25° F. and any necessary adjustments in gas and/or air flow rates are made to achieve this.

With the yoke 33 swung away from the flame axis the conditioned specimen is then inserted securely in the support face side up at a 90° angle to the place of the burners. Weight suspension clip 51 is then attached to the end of the specimen, and the proper weight, 56, for the thickness of test specimen is mounted thereon. The weight, employed are as follows:

| Thickness of test specimen (inches) | Weight (grams) |
| --- | --- |
| ⅜ | 112.5 |
| ½ | 150.0 |
| ⅝ | 187.5 |

The specimen is then swivelled into the plane of the flames and a stop watch is started. The readings on the deflection scale are taken along the face edge. Readings within the first 15 seconds are taken and time to failure is then determined by the specimen breaking or deflecting at an angle that measure three times the thickness of the test specimen.

The herein described apparatus and method provides means for distinghishing between variations in core formulations and is sensitive to different concentrations of glass fibers as well as fiber length. The testing method apparently is unaffected by normal manufacturing tolerances in caliper, weight and density. It exhibits close correlation to ASTM E-119 [6] in the thermal levels, flexural stressing and identification of the materials that are identical in performance to materials that have performed satisfactorily in full scale tests.

[6] Annual Book of ASTM Standards, Part 14, 1973. Designation E-119-73 is under jurisdiction of Committee E-5 of Fire Tests of Materials and Constructions.

I claim:

1. Apparatus for testing the fire resistance of a test strip of wallboard and the like which comprises:
   a pair of opposed and spaced apart gas burners aligned with each other along a substantially vertical axis;
   a horizontal axis located between the pair of burners;
   swivelled clamping means adapted to hold one end of said test strip and to move it into and out of said vertical axis, the other end of said test strip being unrestrained, said clamping means being located along the horizontal axis and spaced from said burners;
   whereby when said test strip is moved into said vertical axis it is disposed along a horizontal axis bisecting the said vertical axis;
   measuring means including indicia aligned with the horizontal axis and spaced from the burners in a direction opposite from the clamping means; and
   means for applying a force to the unrestrained end of said test strip.

2. The apparatus of claim 1 wherein:
   said burners are connected to a supply of combustible gas and air and generate turbulent flames having a temperature at the midpoint between the burners of from about 1755°F. to about 1805°F.

3. The apparatus of claim 2 wherein:
   said clamping means comprises first and second transverse members, said members being spaced apart vertically; and
   means for varying the vertical spacing between said members to accomodate test strips of different thickness, whereby the centerline of the test strip thickness can be made to coincide with said horizontal axis.

4. The apparatus of claim 3 wherein:
   said clamping means has an inner end nearer the burners and said vertical axis bisects the test strip substantially midway between the inner end of said clamping means and the unrestrained end of said test strip.

5. A method for testing the flame resistance of a test strip of wallboard or the like which comprises:
   clamping one end of said test strip in a cantilever position;
   applying a gas flame on both sides of the test strip at a point intermediate of the ends of the test strip;
   simultaneously applying a force to the other end of the test strip; and
   determining the time to achieve a predetermined deflection of the other end or a breaking failure of said test strip, whichever occurs first.

6. The method of claim 5 wherein the test strip is disposed substantially horizontally.

7. The method of claim 6 wherein the temperature of said gas flame at the surface of the test strip is from about 1755°F. to about 1805°F.

8. The method of claim 7 wherein the force is applied by a weight.

* * * * *